(12) United States Patent
Kang et al.

(10) Patent No.: US 9,454,330 B1
(45) Date of Patent: Sep. 27, 2016

(54) METHOD AND APPARATUS FOR OPERATING COMMANDS ON A STORAGE DEVICE CONTROLLER WITHOUT DIRECT CONNECTION WHEN TRANSMITTING DATA OVER A BUS TO A PROCESSING CIRCUITRY

(71) Applicant: Marvell International Ltd., Hamilton (BM)

(72) Inventors: Xinhai Kang, Milpitas, CA (US); Ming Tang, Fremont, CA (US); Qun Zhao, Pleasanton, CA (US); Jing Qian, San Jose, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 97 days.

(21) Appl. No.: 14/284,528

(22) Filed: May 22, 2014

Related U.S. Application Data

(60) Provisional application No. 61/829,454, filed on May 31, 2013.

(51) Int. Cl.
*G06F 3/06* (2006.01)

(52) U.S. Cl.
CPC ............. *G06F 3/0659* (2013.01); *G06F 3/061* (2013.01)

(58) Field of Classification Search
CPC ....... G06F 3/0659; G06F 3/061; G06F 3/067
USPC .................................. 710/5, 33, 58
See application file for complete search history.

(56) References Cited

U.S. PATENT DOCUMENTS

| | | | |
|---|---|---|---|
| 2003/0200284 A1* | 10/2003 | Philbrick ................ | H04L 69/16 709/219 |
| 2009/0300605 A1* | 12/2009 | Edwards ............... | G06F 9/5077 718/1 |

* cited by examiner

*Primary Examiner* — Tammara Peyton

(57) ABSTRACT

Systems and methods for operating on a storage device are provided. A storage device command for operating on data stored in a plurality of locations in a storage device is received, with a storage device controller from processing circuitry over a bus. The storage device command is decoded with the storage device controller to identify a plurality of storage device operations associated with the storage device command. The plurality of storage device operations are executed on the data stored in the storage device without transmitting the data over the bus to the processing circuitry.

20 Claims, 2 Drawing Sheets

US 9,454,330 B1

METHOD AND APPARATUS FOR OPERATING COMMANDS ON A STORAGE DEVICE CONTROLLER WITHOUT DIRECT CONNECTION WHEN TRANSMITTING DATA OVER A BUS TO A PROCESSING CIRCUITRY

CROSS REFERENCE TO RELATED APPLICATION

This disclosure claims the benefit of U.S. Provisional Application No. 61/829,454, filed May 31, 2013, which is incorporated herein by reference in its entirety.

FIELD OF USE

The present disclosure relates generally to storage device systems and methods, and more particularly, to efficiently performing operations on a storage device.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, is neither expressly nor impliedly admitted as prior art against the present disclosure.

Typically, performing storage device operations requires the central processing unit (CPU) to play a key role until the operations are complete. This reduces bandwidth on the bus between the CPU and the storage device because data must continuously be transferred between the storage device and the CPU over the bus. For example, to perform a move operation for a large data set in a storage device, the CPU needs to read each piece of information from one storage location and then write the information to another storage location. Each read and write of the information requires the data to be communicated through the bus between the CPU and the storage device. In addition, because the CPU is heavily involved in the memory operations, the capacity of the CPU is reduced for taking on other tasks.

SUMMARY

In some embodiments, a method for operating on a storage device is provided. A storage device command for operating on data stored in a plurality of locations in a storage device is received, with a storage device controller from processing circuitry over a bus. The storage device command is decoded with the storage device controller to identify a plurality of storage device operations associated with the storage device command. The plurality of storage device operations are executed on the data stored in the storage device without transmitting the data over the bus to the processing circuitry. In some implementations, the storage device command includes at least one of a command to search for data stored in the storage device, move data within the storage device, compare data stored in the storage device, and perform maintenance on data stored in the storage device. In some embodiments, a determination is made as to a type associated with the storage device command. The storage device command may be a generic command and the plurality of storage device operations may include a combination of read and write operations that implement the generic command.

In some embodiments, status information relating to execution of the storage device command is transmitted to the processing circuitry over the bus from the storage device controller. The status information may include a result associated with executing the storage device command.

In some embodiments, a system for operating on a storage device is provided. A storage device controller may be configured to receive, from processing circuitry over a bus, a storage device command for operating on data stored in a plurality of locations in the storage device. The storage device controller may be configured to decode the storage device command with the storage device controller to identify a plurality of storage device operations associated with the storage device command. The storage device controller may be configured to execute the plurality of storage device operations on the data stored in the storage device without transmitting the data over the bus to the processing circuitry. In some implementations, the storage device command includes at least one of a command to search for data stored in the storage device, move data within the storage device, compare data stored in the storage device, and perform maintenance on data stored in the storage device. In some implementations, the controller may be configured to determine a type associated with the storage device command. The storage device command may be a generic command and the plurality of storage device operations may include a combination of read and write operations that implement the generic command.

In some embodiments, the controller is configured to transmit status information relating to execution of the storage device command to the processing circuitry over the bus from the storage device controller. The controller may be configured to receive, with the controller, a status request from the processing circuitry while each of the plurality of storage device operations is executed. The status information that includes a result associated with executing the storage device command may be transmitted to the processing circuitry over the bus.

BRIEF DESCRIPTION OF THE DRAWINGS

The details of one or more implementations are set forth in the accompanying drawings and the description below. Other features and various advantages will be more apparent upon consideration of the following detailed description, taken in conjunction with the accompanying drawings in which.

DETAILED DESCRIPTION

This disclosure generally relates to efficiently storing information in a programmable state storage device. For illustrative purposes, this disclosure is described in the context of a solid state storage device (e.g., volatile storage device, non-volatile storage device, a flash storage device or a NAND-based storage device). It should be understood, however, that this disclosure is applicable to any other type of volatile or non-volatile storage device (e.g., magnetic storage device, RAM, ROM, PROM, EPROM, EEPROM, nvSRAM, FeRAM, MRAM, PRAM, CBRAM, SONOS, RRAM, NRAM, Millipede memory, or holographic storage device).

Figure 1:
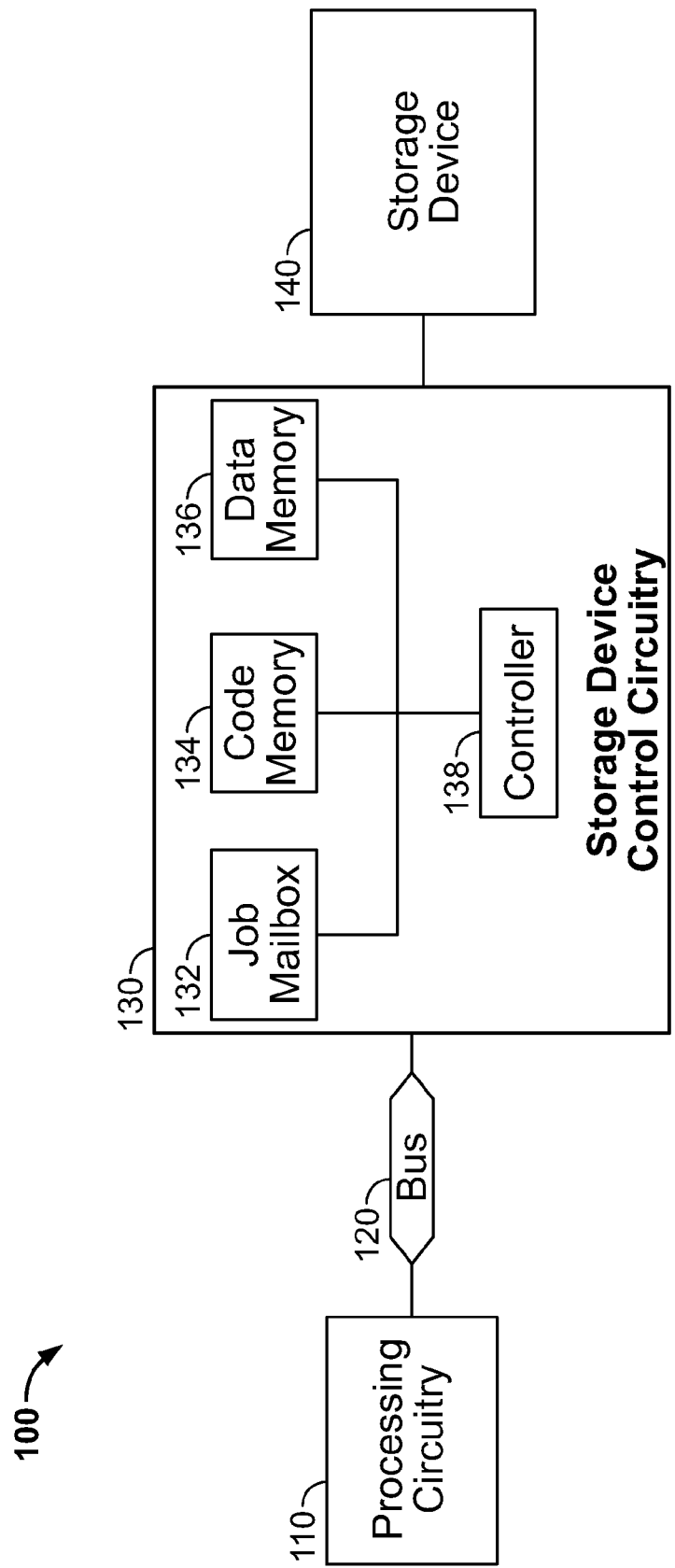
FIG. 1 is a diagram of an illustrative programmable storage device system in accordance with an embodiment of the present disclosure.

FIG. 1 is a diagram of an illustrative storage device system 100 in accordance with an embodiment of the present disclosure. System 100 may include processing circuitry 110, a bus 120, storage device control circuitry 130 (e.g., storage device controller) and a storage device 140. Storage device 140 may in some implementations be a memory device and/or any other device capable of storing data.

Control circuitry 130 may include job mailbox circuitry 132, controller 138, code memory 134, and data memory 136. In some embodiments, control circuitry 130 may receive generic instructions (e.g., a storage device command) from another system component such as processing circuitry 110 over bus 120. For example, processing circuitry 110 may include a CPU and bus 120 may include a northbridge, front-side bus, and/or any other physical connection between processing circuitry 110 and storage device control circuitry 130. The CPU may send instructions to read/write data to storage device 140 through control circuitry 130 over bus 120.

In some embodiments, the generic instructions may include a memory search operation (e.g., an instruction of a first type). Such an instruction identifies a set of data that is compared with other data stored in the storage device to identify a match. If a match is found, the address or location of the match is returned to processing circuitry 110. The generic instructions may include a memory move operation. Such an instruction identifies a set of source storage locations and a set of destination storage locations. The contents of the source storage locations (e.g., the data stored in the source storage locations) is then transferred (moved) to the destination storage locations and optionally deleted from the source storage locations. The generic instructions may include a memory compare operation. Such an instruction identifies two or more storage locations and compares the contents stored at the two or more storage locations. The result is the comparison indicating whether the contents stored in one location are greater than, equal to, or less than another location.

Storage device control circuitry 130 may receive the generic instructions from processing circuitry 110 over bus 120 and store the generic instructions in code memory 134. After the instructions are stored in code memory 134, controller 138 retrieves the generic instructions, decodes the generic instructions, and executes the operations corresponding to the decoded generic instructions.

For example, code memory 134 may store a move instruction (e.g., a first type of instruction). The move instruction may include a source address range and destination address range. In response, controller 138 may retrieve the move instruction and decode the instruction into a set of operations. Specifically, controller 138 may identify a first set of operations that are associated with the first type of instruction. In particular, the set of operations may include an operation to read sequentially the contents from storage device 140 starting from the start address specified in the instruction and ending at the ending address. The set of operations may include an operation to store in data memory 136 the data that is read from each storage device address as the data is read. The set of operations may include an operation to retrieve from data memory 136 each data and sequentially write the data starting at the destination start address specified in the instruction until the destination ending address specified in the instruction (or destination offset from the start address).

For example, code memory 134 may store a search instruction (e.g., a second type of instruction). The search instruction may include a start address, end address, and data for which to search. In response, controller 138 may retrieve the search instruction and decode the instruction into a set of operations. Specifically, controller 138 may identify a second set of operations that are associated with the second type of instruction. In particular, the set of operations may include an operation to read sequentially the contents from storage device 140 starting from either the beginning of storage device 140 or the start address specified in the instruction and ending at the end of storage device 140 (or at the ending address specified by the instruction). The set of operations may include an operation to store in data memory 136 the data that is read from each storage device address as the data is read. The set of operations may instruct controller 138 to compare the data stored in memory 136 with data specified by the received instruction. The set of operations may instruct controller 138 to determine whether the data stored in memory 136 matches the data specified by the received instruction. If the data matches, the set of operations may instruct controller 138 to store in job mailbox 132 an identifier of the storage location of storage device 140 from which the data that matches the data in the received instruction was retrieved. The set of operations may instruct controller 138 to continue retrieving and comparing data from storage device 140 until the ending address or stop executing the instruction after the data that matches is found. If the data does not match, controller 138 may retrieve the data from the next adjacent address in storage device 140, store the data in data memory 136, and compare with the data in the instruction until a match is found.

For example, code memory 134 may store a compare instruction (e.g., a third type of instruction). The compare instruction may include one or more target addresses used to compare. In response, controller 138 may retrieve the search instruction and decode the instruction into a set of operations. Specifically, controller 138 may identify a third set of operations that are associated with the third type of instruction. In some implementations, the set of operations may include an operation to read the contents from storage device 140 at a first addresses specified in the instruction and a second address specified by the instruction. The set of operations may include an operation to store in data memory 136 the data that is read from each storage device address. The set of operations may include an operation to compute a difference between the data read from the first and second addresses. The set of operations may include an operation to indicate as a result: that the contents in the first address are greater than the contents in the second address if the difference is positive; that the contents in the first address are less than the contents in the second address if the difference is negative; or that the contents in the first address are equal to the contents in the second address if the difference is zero. The operations may include an operation to store the result in job mailbox 132 for the received instruction.

For example, code memory 134 may store a compare instruction (e.g., a fourth type of instruction). The compare instruction may include a given address and data used to compare. In response, controller 138 may retrieve the search instruction and decode the instruction into a set of operations. Specifically, controller 138 may identify a fourth set of operations that are associated with the fourth type of instruction. In some implementations, the set of operations may include an operation to read the contents from storage device 140 at a given address specified in the instruction. The set of operations may include an operation to store in data memory 136 the data that is read from the given storage device address. The set of operations may include an operation to compute a difference between the data read from the given address and the data in the instruction. The set of operations may include an operation to indicate as a result: that the contents in the given address are greater than the contents in the instruction if the difference is positive; that the contents in the given address are less than the contents in the instruction if the difference is negative; or that the contents in the given address are equal to the contents in the instruction if the difference is zero. The operations may include an operation to store the result in job mailbox 132 for the received instruction.

In some embodiments, after completing the set of operations decoded from the instruction, controller 138 may store, in job mailbox 132, status information that identifies the received instruction and specifies that the instruction was completed. Control circuitry 130 may automatically transmit an indication to processing circuitry 110 over bus 120 that the particular instruction was completed after the status information indicates that the instruction was completed. In some implementations, processing circuitry 110 may transmit a request over bus 120 to control circuitry 130 for status information associated with a given instruction. Job mailbox 132 may indicate whether a given instruction is in progress or completed. As a result, control circuitry 130 may inform processing circuitry 110 over bus 120 whether the instruction is in progress or has been completed. In case the instruction has been completed, control circuitry 130 may return to processing circuitry 110 as a result of the instruction (e.g., the result of a comparison or the identification of one or more storage locations of data that has been searched).

In some embodiments, because controller 138 executes the operations decoded from the instruction and uses data memory 136 to temporarily store the data read from storage device 140, there is no need to communicate the actual data from storage device 140 to processing circuitry 110. In particular, processing circuitry 110 plays no role in carrying out the storage device instruction but only transmits the instruction to storage device control circuitry 130 for execution. This reduces the amount of data that is communicated over bus 120 because all of the data exchanges needed to complete the instruction are carried out between storage device 140 and control circuitry 130.

Figure 2:
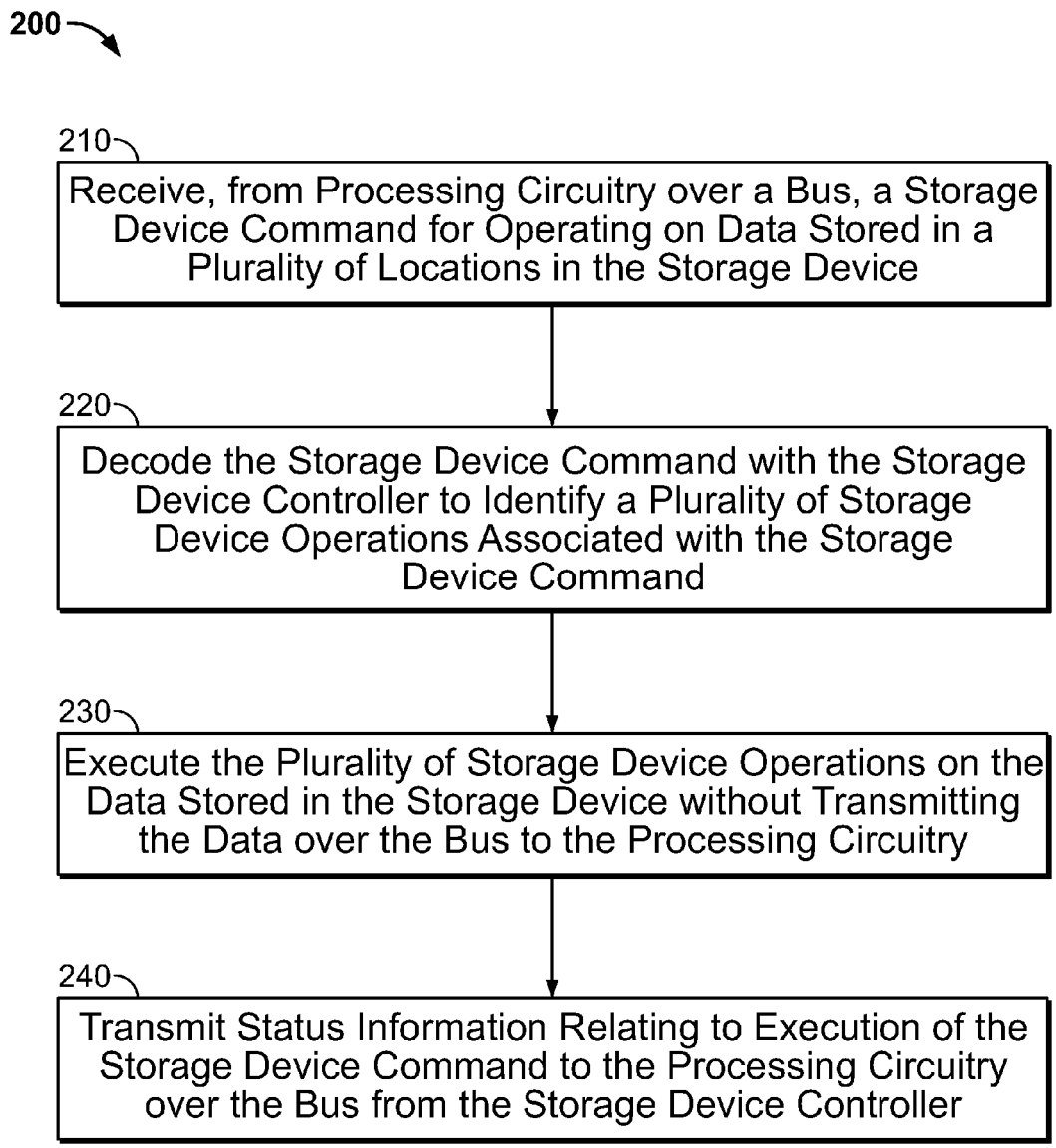
FIG. 2 illustrates a process for operating on a programmable storage device in accordance with an embodiment of the present disclosure.

FIG. 2 illustrates a process 200 for operating on a programmable storage device in accordance with an embodiment of the present disclosure. At 210, a storage device command for operating on data stored in a plurality of locations in the storage device is received with a storage device controller from processing circuitry over a bus. For example, processing circuitry 110 may transmit a storage device instruction over bus 110 to storage device control circuitry 130 (FIG. 1). The instruction may be stored in code memory 134.

At 220, the storage device command is decoded with the storage device controller to identify a plurality of storage device operations associated with the storage device command. For example, controller 138 may decode the instruction stored in code memory 134 into a plurality of operations.

At 230, the plurality of storage device operations is executed on the data stored in the storage device without transmitting the data over the bus to the processing circuitry. For example, controller 138 may operate on storage device 140 to transfer data to and receive data from storage device 140 without communicating the data over bus 120 to processing circuitry 110.

At 240, status information relating to execution of the storage device command is transmitted to the processing circuitry over the bus from the storage device controller. For example, controller 138 may maintain job mailbox 132 updated with current status information for each instruction received from processing circuitry 110. Controller 138 may provide the status information over bus 120 to processing circuitry 110 automatically or in response to a request from processing circuitry 110.

The foregoing describes methods and an apparatus for storing information in a programmable storage device. The above-described embodiments of the present disclosure are presented for the purposes of illustration and not of limitation. Furthermore, the present disclosure is not limited to a particular implementation. For example, one or more steps of methods described above may be performed in a different order (or concurrently) and still achieve desirable results. In addition, the disclosure may be implemented in hardware, such as on an application-specific integrated circuit (ASIC) or on a field-programmable gate array (FPGA). The disclosure may also be implemented in software.

What is claimed is:

1. A method for operating on a storage device, the method comprising:
   receiving, with a storage device controller from processing circuitry over a bus, a storage device command for operating on data stored in a plurality of locations in the storage device, wherein the storage device is communicative coupled to the storage device controller and without a direct connection to the processing circuitry;
   decoding the storage device command with the storage device controller to identify a plurality of storage device operations associated with the storage device command; and
   executing the plurality of storage device operations on the data stored in the storage device without transmitting the data over the bus to the processing circuitry.

2. The method of claim 1 further comprising transmitting status information relating to execution of the storage device command to the processing circuitry over the bus from the storage device controller.

3. The method of claim 2, wherein the status information is transmitted automatically after each of the plurality of storage device operations is executed.

4. The method of claim 1 further comprising receiving, with the controller, a status request from the processing circuitry while each of the plurality of storage device operations is executed.

5. The method of claim 4, wherein status information is transmitted to the processing circuitry over the bus in response to receiving the status request.

6. The method of claim 1, wherein the storage device command includes at least one of a command to search for data stored in the storage device, move data within the storage device, compare data stored in the storage device, and perform maintenance on data stored in the storage device.

7. The method of claim 1, wherein status information that includes a result associated with executing the storage device command is transmitted to the processing circuitry over the bus.

8. The method of claim 1 further comprising determining a type associated with the storage device command.

9. The method of claim 8, wherein the plurality of storage device operations is specific to the type associated with the storage device command.

10. The method of claim 1, wherein the storage device command is a generic command, and wherein the plurality of storage device operations includes a combination of read and write operations that implement the generic command.

11. A system for operating on a storage device, the system comprising:
 processing circuitry to issue a storage device command;
 a storage device without a direct connection to the processing circuitry, the storage device configured to store data in a plurality of locations in the storage device; and
 a storage device controller communicatively coupled to the processing circuitry via a bus and communicatively coupled to the storage device, the storage device controller configured to:
  receive, from processing circuitry over the bus, the storage device command for operating on the data,
  decode the storage device command to identify a plurality of storage device operations associated with the storage device command, and
  execute the plurality of storage device operations on the data stored in the storage device without transmitting the data over the bus to the processing circuitry.

12. The system of claim 11, wherein the controller is further configured to transmit status information relating to execution of the storage device command to the processing circuitry over the bus from the storage device controller.

13. The system of claim 12, wherein the status information is transmitted automatically after each of the plurality of storage device operations is executed.

14. The system of claim 11, wherein the controller is further configured to receive, with the controller, a status request from the processing circuitry while each of the plurality of storage device operations is executed.

15. The system of claim 14, wherein status information is transmitted to the processing circuitry over the bus in response to receiving the status request.

16. The system of claim 11, wherein the storage device command includes at least one of a command to search for data stored in the storage device, move data within the storage device, compare data stored in the storage device, and perform maintenance on data stored in the storage device.

17. The system of claim 11, wherein status information that includes a result associated with executing the storage device command is transmitted to the processing circuitry over the bus.

18. The system of claim 11, wherein the controller is further configured to determine a type associated with the storage device command.

19. The system of claim 18, wherein the plurality of storage device operations is specific to the type associated with the storage device command.

20. The system of claim 11, wherein the storage device command is a generic command, and wherein the plurality of storage device operations includes a combination of read and write operations that implement the generic command.

* * * * *